(12) United States Patent
Chen et al.

(10) Patent No.: US 12,483,924 B2
(45) Date of Patent: Nov. 25, 2025

(54) DATA FLOW TRANSMISSION METHOD, TERMINAL AND NETWORK-SIDE DEVICE

(71) Applicant: DATANG MOBILE COMMUNICATIONS EQUIPMENT CO., LTD., Beijing (CN)

(72) Inventors: Li Chen, Beijing (CN); Dajun Zhang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 426 days.

(21) Appl. No.: 17/800,506

(22) PCT Filed: Dec. 16, 2020

(86) PCT No.: PCT/CN2020/136826
§ 371 (c)(1),
(2) Date: Aug. 17, 2022

(87) PCT Pub. No.: WO2021/164400
PCT Pub. Date: Aug. 26, 2021

(65) Prior Publication Data
US 2023/0085168 A1 Mar. 16, 2023

(30) Foreign Application Priority Data
Feb. 17, 2020 (CN) .......... 202010097062.4

(51) Int. Cl.
*H04W 28/02* (2009.01)
*H04W 28/24* (2009.01)
(Continued)

(52) U.S. Cl.
CPC ....... *H04W 28/0263* (2013.01); *H04W 28/24* (2013.01); *H04W 76/40* (2018.02); *H04W 80/02* (2013.01); *H04W 88/10* (2013.01)

(58) Field of Classification Search
CPC . H04W 28/0263; H04W 28/24; H04W 76/40; H04W 80/02; H04W 88/10;
(Continued)

(56) References Cited

U.S. PATENT DOCUMENTS

2005/0043050 A1 2/2005 Lee et al.
2009/0138614 A1 5/2009 Prasad et al.
(Continued)

FOREIGN PATENT DOCUMENTS

CN 105009609 A 10/2015
CN 108476142 A 8/2018
(Continued)

OTHER PUBLICATIONS

First Office Action for Japanese Patent Application No. 2022-549560 issued by the Japanese Patent Office on Jun. 20, 2023 and it's English translation provided by the foreign associate.
(Continued)

*Primary Examiner* — Walter J Divito
(74) *Attorney, Agent, or Firm* — Ladas & Parry, LLP

(57) ABSTRACT

A data flow transmission method, a terminal, and a network-side device are provided. The data flow transmission method includes: mapping QoS flows of an MBS to an MRB and a DRB; transmitting the QoS flows through at least one of the MRB or the DRB.

20 Claims, 4 Drawing Sheets

```
mapping QoS flows of an MBS to an MRB and     ─── 201
              a DRB
                  │
                  ▼
transmitting the QoS flows through at least one ─── 202
           of the MRB and the DRB
```

(51) Int. Cl.
*H04W 76/40* (2018.01)
*H04W 80/02* (2009.01)
*H04W 88/10* (2009.01)

(58) Field of Classification Search
CPC ... H04W 76/15; H04W 28/0252; H04W 4/06; H04W 72/12
See application file for complete search history.

(56) References Cited

U.S. PATENT DOCUMENTS

| | | | |
|---|---|---|---|
| 2010/0322196 A1 | 12/2010 | Cherian | |
| 2016/0157065 A1 | 6/2016 | Lee et al. | |
| 2017/0201964 A1 | 7/2017 | Gupta et al. | |
| 2018/0376384 A1 | 12/2018 | Youn et al. | |
| 2019/0166580 A1 | 5/2019 | Prasad et al. | |
| 2019/0230564 A1 | 7/2019 | Kim et al. | |
| 2019/0313278 A1 | 10/2019 | Liu | |
| 2020/0322831 A1 | 10/2020 | Xu et al. | |
| 2020/0323024 A1 | 10/2020 | Huang et al. | |
| 2021/0014722 A1 | 1/2021 | Han et al. | |
| 2021/0022063 A1 | 1/2021 | Yang et al. | |
| 2021/0068004 A1* | 3/2021 | Kadiri | H04W 28/0263 |
| 2021/0127295 A1* | 4/2021 | Jo | H04W 80/08 |
| 2021/0258918 A1* | 8/2021 | Hong | H04W 36/0007 |
| 2022/0256505 A1* | 8/2022 | Qi | H04W 28/0263 |
| 2023/0082017 A1* | 3/2023 | Hong | H04W 76/22 370/312 |

FOREIGN PATENT DOCUMENTS

| | | |
|---|---|---|
| CN | 110036661 A | 7/2019 |
| CN | 110351043 A | 10/2019 |
| CN | 110366131 A | 10/2019 |
| CN | 110741701 A | 1/2020 |
| JP | 2012523763 A | 10/2012 |
| JP | 2021508968 A | 3/2021 |
| KR | 100943901 B1 | 2/2010 |
| KR | 10-20190020142 A | 2/2019 |
| WO | 2019009578 A1 | 1/2019 |
| WO | 2019129212 A1 | 7/2019 |
| WO | 2019223780 A1 | 11/2019 |

OTHER PUBLICATIONS

International Search Report for international Application No. PCT/CN2020/136826 issued on Mar. 17, 2021 and its English Translation provided by WIPO.

Written Opinion for international Application No. PCT/CN2020/136826 issued on Mar. 17, 2021 and its English Translation provided by WIPO.

International Preliminary Report on Patentability PCT/CN2020/136826 issued on Aug. 23, 2022 and its English Translation provided by WIPO.

"Solution: Integrated MBS and Unicast Transport with Full Separation of MBS Service," SA WG2 Meeting #136 S2-1911371, Reno, Nevada, USA Nov. 18-22, 2019 (was S2-19xxxx), Source: Qualcomm Incorporated, Agenda Item: 8.7, all pages.

"Update of KI#1: MBS session management," 3GPP TSG SA2 Meeting #136AH, S2-2001378, Incheon, South Korea, Jan. 13-17, 2020, Source: Huawei, Hisilicon, Agenda Item: 8.7, all pages.

The Extended European Search Report for European Patent Application 20919680.7 issued on Jan. 4, 2023.

First Office Action for Chinese Patent Application No. 202010097062.4 issued on Dec. 15, 2021 and its English translation provided by global dossier.

"Introduction of additional enhancements for NB-IoT in TS 36.331," 3GPP TSG-RAN2 Meeting #108, R2-1915298, Reno, Nevada, USA, Nov. 18-22, 2019, Source to WG: Huawei, Source to TSG: R2, all pages.

Office action from corresponding South Korean Patent Application No. 10-2022-7032233 dated Jan. 31, 2025, and its English translation.

* cited by examiner receiving QoS flows of an MBS through at least one of an MRB and a DRB — 401

DATA FLOW TRANSMISSION METHOD, TERMINAL AND NETWORK-SIDE DEVICE

CROSS-REFERENCE TO RELATED APPLICATIONS

The present application is the U.S. national phase of PCT Application PCT/CN2020/136826 filed on Dec. 16, 2020, which claims a priority to Chinese patent application No. 202010097062.4 filed on Feb. 17, 2020, the disclosures of which are incorporated herein by reference in their entireties.

TECHNICAL FIELD

The present disclosure relates to the field of communications technologies, and in particular, to a data flow transmission method, a terminal, and a network-side device.

BACKGROUND

Multicast and Broadcast Services (MBS) is a Multicast Broadcast multimedia service MBMS (Multicast Broadcast multimedia service) service introduced by some communication systems (e.g., 5G systems). When MBS transmission is needed, the QoS flow of MBS service is mapped to the multicast broadcast service Radio Bearer (MBS Radio Bearer, MRB). Because only the QoS flow of the MBS is mapped to the MRB, the reliability of the MBS is poor.

SUMMARY

The embodiment of the disclosure provides a data flow transmission method, a terminal and a network-side device, so as to solve the problem that reliability of an MBS is poor due to the fact that only QoS flow of the MBS is mapped to an MRB.

The embodiment of the disclosure provides a data flow transmission method, applied to network-side device and including:
mapping Quality of Service (QoS) flows of a Multicast and Broadcast Services (MBS) to an MBS Radio Bearer (MRB) and a Data Radio Bearer (DRB);
transmitting the QoS flows through at least one of the MRB or the DRB.

Optionally, the mapping the QoS flows of the MBS to the MRB and the DRB includes:
mapping the QoS flows of the MBS to the MRB and the DRB through a Service Data Adaptation Protocol (SDAP) layer, where a first Packet Data Convergence Protocol (PDCP) entity and a first Radio Link Control (RLC) entity which correspond to the MRB are independent from a second PDCP entity and a second RLC entity which correspond to the DRB.

Optionally, the first PDCP entity and the second PDCP entity include independently at least one of the following functions:
encryption, integrity protection, or header compression functions.

Optionally, the MRB and the DRB share a same Media Access Control (MAC) entity; or
the MRB and the DRB correspond to different MAC entities.

Optionally, the transmitting the QoS flows through at least one of the MRB or the DRB includes:
the SDAP layer delivering data packets of the QoS flows to the first PDCP entity and the second PDCP entity;
the first PDCP entity delivering the data packets to the first RLC entity, and/or the second PDCP entity delivering the data packet to the second RLC entity.

Optionally, the first PDCP entity delivering the data packets to the first RLC entity and/or the second PDCP entity delivering the data packets to the second RLC entity includes:
a target PDCP entity starting a corresponding PDCP discard timer aiming at each data packet of the QoS flows;
when the target PDCP entity allows a data transmission of the corresponding MRB or DRB, delivering the data packets of the QoS flows to a target RLC entity;
when the target PDCP does not allow the data transmission of the corresponding MRB or DRB, discarding the data packets when the PDCP discard timer expires;
where the target PDCP is the first PDCP entity and the target RLC is the first RLC entity, or the target PDCP is the second PDCP entity and the target RLC is the second RLC entity.

Optionally, the delivering the data packets of the QoS flows to the target RLC entity when the target PDCP entity allows the data transmission of the corresponding MRB or DRB includes:
when the target PDCP entity allows the data transmission of the corresponding MRB or DRB, delivering, the data packets in the QoS flows when the PDCP discard timer does not expire, to the target RLC entity.

Optionally, the transmitting the QoS flows through at least one of the MRB or the DRB includes:
the SDAP layer delivering the data packets of the QoS flows to the first PDCP entity which allows the MRB to perform the data transmission, or delivering the data packets of the QoS flows to the second PDCP entity which allows the DRB to perform the data transmission;
the PDCP entity which receives the data packets of the QoS flows delivering the data packets to a corresponding RLC entity.

Optionally, the QoS flows mapped to the MRB in the QoS flows of the MBS are the same with the QoS flows mapped to the DRB in the QoS flows of the MBS; or
the QoS flows mapped to the MRB in the QoS flows of the MBS and the QoS flows mapped to the DRB in the QoS flows of the MBS are partially or totally different.

Optionally, an interface is established between the first PDCP entity and the second PDCP entity and configured to transmit information to enable the first PDCP entity and the second PDCP entity to add a same PDCP sequence number (SN) to a same data packet.

Optionally, the method further includes:
determining, by the PDCP entity which is sending the data packets of the QoS flows of the MBS in the first PDCP entity and the second PDCP entity, the PDCP SN of the next data packet delivered by the SDAP layer and transmitting the PDCP SN to the other PDCP entity, and the other PDCP entity distributing the PDCP SN to the next data packet delivered by the SDAP layer.

A data flow transmission method is further provided in the present disclosure, applied to a terminal and including:
receiving Quality of Service (QoS) flows of a Multicast and Broadcast Services (MBS) through at least one of an MBS Radio Bearer (MRB) and a Data Radio Bearer (DRB), where the QoS flows of the MBS are mapped respectively to the MRB and the DRB.

Optionally, a first Packet Data Convergence Protocol (PDCP) entity and a first Radio Link Control (RLC) entity which correspond to the MRB are independent from a second PDCP entity and a second RLC entity which correspond to the DRB.

Optionally, the first PDCP entity and the second PDCP entity include independently at least one of the following functions:
decryption, de-integrity protection, or de-header compression functions.

Optionally, the MRB and the DRB share a same Media Access Control (MAC) entity; or
the MRB and the DRB correspond to different MAC entities.

Optionally, the receiving the QoS flows of the MBS through at least one of the MRB or the DRB includes:
the first RLC entity transmitting data packets of the QoS flows of the MBS received by the MAC layer to the first PDCP entity, and the first PDCP entity uploading the data packets to a Service Data Adaptation Protocol (SDAP) layer; and/or
the second RLC entity transmitting data packets of the QoS flows of the MBS received by the MAC layer to the second PDCP entity, and the second PDCP entity uploading the data packets to an SDAP layer.

Optionally, the QoS flows mapped to the MRB in the QoS flows of the MBS are the same with the QoS flows mapped to the DRB in the QoS flows of the MBS; or
the QoS flows mapped to the MRB in the QoS flows of the MBS and the QoS flows mapped to the DRB in the QoS flows of the MBS are partially or totally different.

Optionally, the method further includes:
the first PDCP entity and/or the second PDCP entity delivering data packets to an upper layer, and the upper layer performing a duplication detection; or
establishing an interface between the first PDCP entity and the second PDCP entity, the first PDCP entity transmitting PDCP Protocol Data Units (PDUs) to the second PDCP entity through the interface, the second PDCP entity performing a duplication detection, where the PDCP PDU is a PDU containing the data packets of the QoS flows of the MBS; or
establishing an interface between the first PDCP entity and the second PDCP entity, the second PDCP entity transmitting PDCP PDUs to the first PDCP entity through the interface, the second PDCP entity performing a duplication detection, where the PDCP PDUs contain the data packets of the QoS flows of the MBS.

Optionally, the first PDCP entity transmitting the PDCP PDUs to the second PDCP entity through the interface includes:
the first PDCP entity directly transmitting received PDCP PDUs to the second PDCP entity through the interface without sorting the received PDCP PDUs;
or
the second PDCP entity transmitting the PDCP PDUs to the first PDCP entity through the interface including:
the second PDCP entity directly transmitting received PDCP PDUs to the first PDCP entity through the interface without sorting the received PDCP PDUs.

Optionally, the first PDCP entity performing the duplicate detection includes:
the first PDCP entity processing the received PDCP PDUs transmitted by the second PDCP entity through the interface and the PDCP PDUs received from the first RLC entity to perform the duplication detection, and when the PDCP SNs contained in the PDCP PDUs are received in the first PDCP entity, discarding the PDCP PDUs;
or
the second PDCP entity performing the duplicate detection including:
the second PDCP entity processing the received PDCP PDUs transmitted by the first PDCP entity through the interface and the PDCP PDUs received from the second RLC entity to perform the duplication detection, and when the PDCP SNs contained in the PDCP PDUs are received in the first PDCP entity, discarding the PDCP PDUs.

A network-side device is further provided in the present disclosure, including:
a mapping module, configured to map Quality of Service (QoS) flows of a Multicast and Broadcast Services (MBS) to an MBS Radio Bearer (MRB) and a Data Radio Bearer (DRB);
a transmitting module, configured to transmit the QoS flows through at least one of the MRB or the DRB.

Optionally, the mapping the QoS flows of the MBS to the MRB and the DRB includes:
mapping the QoS flows of the MBS to the MRB and the DRB through a Service Data Adaptation Protocol (SDAP) layer, where a first Packet Data Convergence Protocol (PDCP) entity and a first Radio Link Control (RLC) entity which correspond to the MRB are independent from a second PDCP entity and a second RLC entity which correspond to the DRB.

Optionally, the transmitting module is configured to perform:
the SDAP layer delivering data packets of the QoS flows to the first PDCP entity and the second PDCP entity;
the first PDCP entity delivering the data packets to the first RLC entity, and/or the second PDCP entity delivering the data packet to the second RLC entity.

Optionally, the transmitting module is configured to perform:
the SDAP layer delivering the data packets of the QoS flows to the first PDCP entity which allows the MRB to perform the data transmission, or delivering the data packets of the QoS flows to the second PDCP entity which allows the DRB to perform the data transmission;
the PDCP entity which receives the data packets of the QoS flows delivering the data packets to a corresponding RLC entity.

A terminal is further provided in the present disclosure, including:
a receiving module, configured to receive Quality of Service (QoS) flows of a Multicast and Broadcast Services (MBS) through at least one of an MBS Radio Bearer (MRB) and a Data Radio Bearer (DRB), where the QoS flows of the MBS are mapped respectively to the MRB and the DRB.

Optionally, a first Packet Data Convergence Protocol (PDCP) entity and a first Radio Link Control (RLC) entity which correspond to the MRB are independent from a second PDCP entity and a second RLC entity which correspond to the DRB.

Optionally, the receiving module is configure to perform:
the first RLC entity transmitting data packets of the QoS flows of the MBS received by the MAC layer to the first PDCP entity, and the first PDCP entity uploading the data packets to a Service Data Adaptation Protocol (SDAP) layer; and/or
the second RLC entity transmitting data packets of the QoS flows of the MBS received by the MAC layer to the second PDCP entity, and the second PDCP entity uploading the data packets to an SDAP layer A network-side device is further provided in the present disclosure, including: a transceiver, a memory, a processor, and a program stored on the memory and executable on the processor, the transceiver or the processor is configured to map Quality of Service (QoS) flows of a Multicast and Broadcast Services (MBS) to an MBS Radio Bearer (MRB) and a Data Radio Bearer (DRB);

the transceiver is configured to transmit the QoS flows through at least one of the MRB or the DRB.

Optionally, the mapping the QoS flow of the MBS to the MRB and the DRB includes:

mapping the QoS flows of the MBS to the MRB and the DRB through a Service Data Adaptation Protocol (SDAP) layer, where a first Packet Data Convergence Protocol (PDCP) entity and a first Radio Link Control (RLC) entity which correspond to the MRB are independent from a second PDCP entity and a second RLC entity which correspond to the DRB.

Optionally, the first PDCP entity and the second PDCP entity include independently at least one of the following functions:

encryption, integrity protection, or header compression functions.

Optionally, the MRB and the DRB share a same Media Access Control (MAC) entity; or the MRB and the DRB correspond to different MAC entities.

Optionally, the transmitting the QoS flows through at least one of the MRB or the DRB includes:

the SDAP layer delivering data packets of the QoS flows to the first PDCP entity and the second PDCP entity;

the first PDCP entity delivering the data packets to the first RLC entity, and/or the second PDCP entity delivering the data packet to the second RLC entity.

Optionally, the first PDCP entity delivering the data packets to the first RLC entity and/or the second PDCP entity delivering the data packets to the second RLC entity includes:

a target PDCP entity starting a corresponding PDCP discard timer aiming at each data packet of the QoS flows;

when the target PDCP entity allows a data transmission of the corresponding MRB or DRB, delivering the data packets of the QoS flows to a target RLC entity;

when the target PDCP does not allow the data transmission of the corresponding MRB or DRB, discarding the data packets when the PDCP discard timer expires;

where the target PDCP is the first PDCP entity and the target RLC is the first RLC entity, or the target PDCP is the second PDCP entity and the target RLC is the second RLC entity.

Optionally, the delivering the data packets of the QoS flows to the target RLC entity when the target PDCP entity allows the data transmission of the corresponding MRB or DRB includes:

when the target PDCP entity allows the data transmission of the corresponding MRB or DRB, delivering, the data packets in the QoS flows when the PDCP discard timer does not expire, to the target RLC entity.

Optionally, the transmitting the QoS flows through at least one of the MRB or the DRB includes:

the SDAP layer delivering the data packets of the QoS flows to the first PDCP entity which allows the MRB to perform the data transmission, or delivering the data packets of the QoS flows to the second PDCP entity which allows the DRB to perform the data transmission;

the PDCP entity which receives the data packets of the QoS flows delivering the data packets to a corresponding RLC entity.

Optionally, the QoS flows mapped to the MRB in the QoS flows of the MBS are the same with the QoS flows mapped to the DRB in the QoS flows of the MBS; or the QoS flows mapped to the MRB in the QoS flows of the MBS and the QoS flows mapped to the DRB in the QoS flows of the MBS are partially or totally different.

Optionally, an interface is established between the first PDCP entity and the second PDCP entity and configured to transmit information to enable the first PDCP entity and the second PDCP entity to add a same PDCP sequence number (SN) to a same data packet.

Optionally, the processor is further configured to perform: determining, by the PDCP entity which is sending the data packets of the QoS flows of the MBS in the first PDCP entity and the second PDCP entity, the PDCP SN of the next data packet delivered by the SDAP layer and transmitting the PDCP SN to the other PDCP entity, and the other PDCP entity distributing the PDCP SN to the next data packet delivered by the SDAP layer.

A terminal is further provided in the present disclosure, including: a transceiver, a memory, a processor, and a program stored on the memory and executable on the processor, the transceiver is configured to receive Quality of Service (QoS) flows of a Multicast and Broadcast Services (MBS) through at least one of an MBS Radio Bearer (MRB) and a Data Radio Bearer (DRB), where the QoS flows of the MBS are mapped respectively to the MRB and the DRB.

Optionally, a first Packet Data Convergence Protocol (PDCP) entity and a first Radio Link Control (RLC) entity which correspond to the MRB are independent from a second PDCP entity and a second RLC entity which correspond to the DRB.

Optionally, the first PDCP entity and the second PDCP entity include independently at least one of the following functions:

decryption, de-integrity protection, or de-header compression functions.

Optionally, the MRB and the DRB share a same Media Access Control (MAC) entity; or the MRB and the DRB correspond to different MAC entities.

Optionally, the receiving the QoS flows of the MBS through at least one of the MRB or the DRB includes:

the first RLC entity transmitting data packets of the QoS flows of the MBS received by the MAC layer to the first PDCP entity, and the first PDCP entity uploading the data packets to a Service Data Adaptation Protocol (SDAP) layer; and/or the second RLC entity transmitting data packets of the QoS flows of the MBS received by the MAC layer to the second PDCP entity, and the second PDCP entity uploading the data packets to an SDAP layer.

Optionally, the QoS flows mapped to the MRB in the QoS flows of the MBS are the same with the QoS flows mapped to the DRB in the QoS flows of the MBS; or the QoS flows mapped to the MRB in the QoS flows of the MBS and the QoS flows mapped to the DRB in the QoS flows of the MBS are partially or totally different.

Optionally, the transceiver or the processor is configured to perform:

the first PDCP entity and/or the second PDCP entity delivering data packets to an upper layer, and the upper layer performing a duplication detection; or establishing an interface between the first PDCP entity and the second PDCP entity, the first PDCP entity transmitting PDCP Protocol Data Units (PDUs) to the second PDCP entity through the interface, the second PDCP entity performing a duplication detection, where the PDCP PDU is a PDU containing the data packets of the QoS flows of the MBS; or establishing an interface between the first PDCP entity and the second PDCP entity, the second PDCP entity transmitting PDCP PDUs to the first PDCP entity through the interface, the second PDCP entity performing a duplication detection, where the PDCP PDUs contain the data packets of the QoS flows of the MBS.

Optionally, the first PDCP entity transmitting the PDCP PDUs to the second PDCP entity through the interface includes:

the first PDCP entity directly transmitting received PDCP PDUs to the second PDCP entity through the interface without sorting the received PDCP PDUs;

or the second PDCP entity transmitting the PDCP PDUs to the first PDCP entity through the interface including:

the second PDCP entity directly transmitting received PDCP PDUs to the first PDCP entity through the interface without sorting the received PDCP PDUs.

Optionally, the first PDCP entity performing the duplicate detection includes:

the first PDCP entity processing the received PDCP PDUs transmitted by the second PDCP entity through the interface and the PDCP PDUs received from the first RLC entity to perform the duplication detection, and when the PDCP SNs contained in the PDCP PDUs are received in the first PDCP entity, discarding the PDCP PDUs;

or the second PDCP entity performing the duplicate detection including:

the second PDCP entity processing the received PDCP PDUs transmitted by the first PDCP entity through the interface and the PDCP PDUs received from the second RLC entity to perform the duplication detection, and when the PDCP SNs contained in the PDCP PDUs are received in the first PDCP entity, discarding the PDCP PDUs.

A computer readable storage medium is further provided in the present disclosure, storing a computer program, where a processor executes the computer program to perform the data flow transmission method at the network-side device side, or a processor executes the computer program to perform the data flow transmission method at the terminal side.

In the embodiment of the disclosure, QoS flow of MBS is mapped to MRB and Data Radio Bearer (DRB); transmitting the QoS flow through at least one of the MRB or the DRB. Because the QoS flow of the MBS is mapped to the MRB and the Data Radio Bearer (DRB), the reliability of the MBS can be improved.

DETAILED DESCRIPTION

To make the technical problems, technical solutions and advantages to be solved by the present disclosure clearer, the following detailed description is made with reference to the accompanying drawings and specific embodiments.

Figure 1:
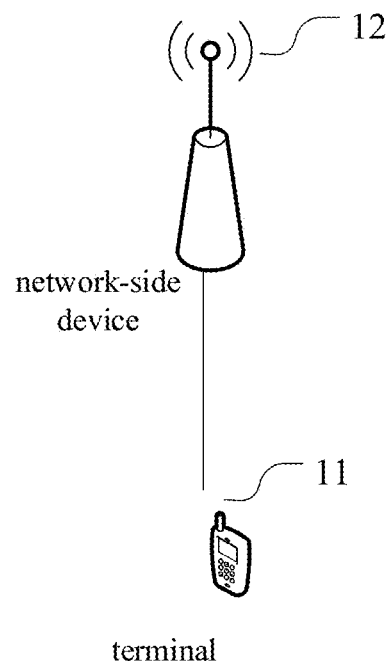
FIG. 1 is a schematic diagram of a network architecture in an embodiment of the present disclosure are applicable.

Referring to FIG. 1, FIG. 1 is a schematic diagram of a network structure to which the embodiment of the present disclosure is applicable, and as shown in FIG. 1, the network structure includes a terminal 11 and a network-side device 12, where the terminal 11 may be a User Equipment (UE) or other terminal devices, for example: a Mobile phone, a Tablet Personal Computer (Tablet Personal Computer), a Laptop Computer (Laptop Computer), a Personal Digital Assistant (PDA), a Mobile Internet Device (MID), a Wearable Device (Wearable Device), a robot, a vehicle, and other terminal side devices, and it should be noted that the specific type of the terminal is not limited in the embodiment of the present disclosure. The network-side device 12 may be an access network-side device, such as a base station, for example: macro station, LTE eNB, 5G NR NB, and the like; the network-side device may also be a small station, such as a Low Power Node (LPN), pico, femto, or the network-side device may be an Access Point (AP); the network-side device may also be a Central Unit (CU), or may be a network node such as a Transmission Reception Point (TRP); or the network-side device may also be a core network-side device, for example: mobility Management Entity (MME), Access Mobility Management Function (AMF), Session Management Function (SMF), User Plane Function (User Plane Function, UPF), Serving GateWay (SGW), PDN GateWay (PDN GateWay), Policy Control Function (Policy Control Function, PCF), Policy and Charging Rules Function (PCRF), Serving GPRS Support Node (Serving GPRS Support Node, SGSN). It should be noted that, in the embodiment of the present disclosure, the specific type of the network-side device is not limited.

Figure 2:
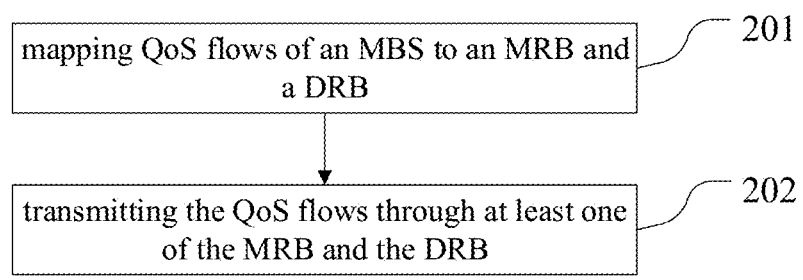
FIG. 2 is a flowchart of a data flow transmission method in an embodiment of the present disclosure.

Referring to FIG. 2, FIG. 2 is a flowchart of a data flow transmission method provided in an embodiment of the present disclosure, where the method is applied to a network-side device, as shown in FIG. 2, and includes the following steps:

201. mapping the QoS flow of the MBS to the MRB and the DRB;

202. transmitting the QoS flow through at least one of the MRB or the DRB.

The mapping of the QoS flow of the MBS to the MRB and the DRB may be mapping all or part of the QoS flow of the MBS to the MRB and the DRB. The mapping here may be to map the QoS flow of the MBS to the MRB and the DRB simultaneously.

Further, mapping the QoS flow of the MBS to the MRB and the DRB may be mapping the QoS flow of the MBS to an MRB and a DRB, and configuring corresponding protocol stacks for the MRB and the DRB, and further, configuring parameters of layer 2 and layer 1 of the MRB and the DRB, respectively.

The above-mentioned transmitting the QoS flow through at least one of the MRB or the DRB may be selecting at least one of the MRB or the DRB according to different requirements to transmit the QoS flow at the same time, for example: when one RB in the MRB and DRB is sufficiently reliable, one of the RBs may be selected for transmission, or both RBs may be selected for transmission at the same time.

In addition, the transmitting the QoS flow through at least one of the MRB or the DRB may be transmitting a data packet in the QoS flow to the terminal through at least one of the MRB or the DRB.

In the embodiment of the disclosure, because the QoS flow of the MBS is mapped to the MRB and the DRB, the reliability of the MBS can be improved. In addition, because the QoS flow of the MBS is mapped to the MRB and the DRB, the transmission can be carried out on the two RBs so as to improve the transmission continuity of the MBS. For example: when one RB fails to transmit, another RB is adopted to transmit, for example, when MBS service fails to transmit through MRB, the MBS service is converted to DRB to transmit, and further, because the MBS service is mapped to the DRB before transmission, the condition that data packet loss occurs in the process of service bearing remapping can be avoided.

As an optional implementation manner, the mapping the QoS flow of the MBS to the MRB and the DRB includes:
  mapping the QoS flow of the MBS to an MRB and a DRB through an SDAP layer, where a first PDCP entity and a first RLC entity corresponding to the MRB are independent from a second PDCP entity and a second RLC entity corresponding to the DRB.

Figures 3, 4:
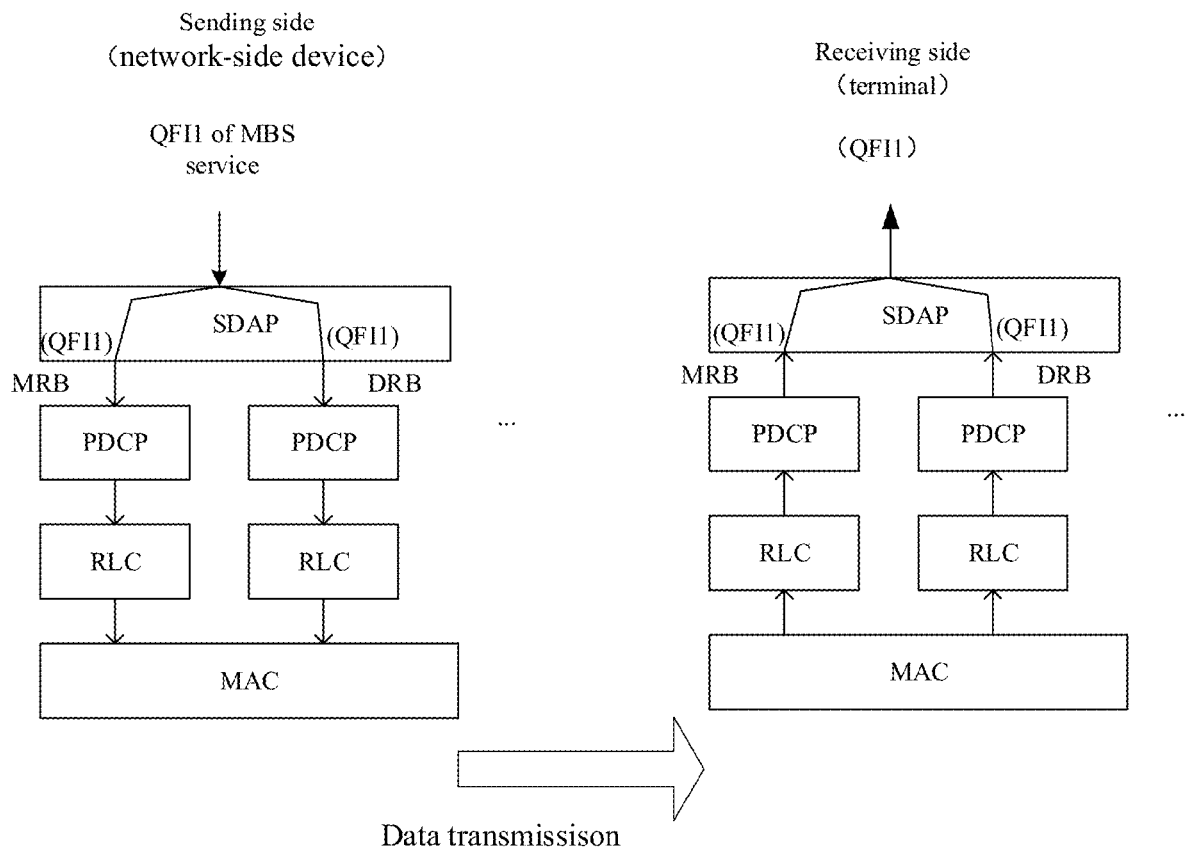
FIG. 3 is a schematic diagram of data flow transmission in an embodiment of the present disclosure.
FIG. 4 is another flowchart of a data flow transmission method in an embodiment of the present disclosure.

The embodiment may be as shown in FIG. 3, the first PDCP entity and the first RLC entity may be PDCP entities and RLC entities corresponding to the MRB of the network-side device, and the second PDCP entity and the second RLC entity may be PDCP entities and RLC entities corresponding to the DRB of the network-side device.

FIG. 3 is an illustration that the MRB and the DRB share the same MAC entity, and in this embodiment, the MRB and the DRB may also correspond to different MAC entities, such as a first MAC entity and a second MAC entity.

Further, in this embodiment, the first PDCP entity and the first RLC entity corresponding to the MRB at the terminal side and the second PDCP entity and the second RLC entity corresponding to the DRB are also independent from each other, as shown in FIG. 3.

Optionally, the first PDCP entity and the second PDCP entity independently have at least one of the following functions:
  encryption, integrity protection, or header compression functions.

Thus, each PDCP entity can perform a corresponding data operation to reduce interactions before protocol entities.

In one implementation, the transmitting the QoS flow through at least one of the MRB or the DRB includes:
  the SDAP layer delivers the data packets of the QoS flow to the first PDCP entity and the second PDCP entity;
  the first PDCP entity delivers the data packet to the first RLC entity, and/or the second PDCP entity delivers the data packet to the second RLC entity.

The SDAP layer may deliver the data packet of the QoS flow to the first PDCP entity and the second PDCP entity by respectively delivering the same data packet to the first PDCP entity and the second PDCP entity.

The first PDCP entity may deliver the data packet to the first RLC entity, and/or the second PDCP entity may deliver the data packet to the second RLC entity, and the first PDCP entity and the second PDCP entity may determine whether to deliver the data packet to the RLC entity according to a requirement.

In the embodiment of the present disclosure, the PDCP entity may deliver the data packet to the RLC entity after the PDCP entity performs the PDCP layer related operation on the data packet, and then deliver the data packet to the RLC entity, for example, after performing at least one of the operations of ciphering, integrity protection, and header compression, the data packet is delivered to the RLC entity, which is not limited specifically.

Optionally, the first PDCP entity delivering the data packet to the first RLC entity, and/or the second PDCP entity delivering the data packet to the second RLC entity includes:
  the target PDCP entity starts a corresponding PDCP discard timer (PDCP discard timer) aiming at each data packet of the QoS flow;
  if the target PDCP entity allows the data transmission of the corresponding MRB or DRB, the data packet of the QoS flow is delivered to a target RLC entity;
  if the target PDCP does not allow the data transmission of the corresponding MRB or DRB, discarding the data packet when the PDCP discard timer expires;
  the target PDCP is the first PDCP entity, the target RLC is the first RLC entity, or the target PDCP is the second PDCP entity, and the target RLC is the second RLC entity.

If the target PDCP entity allows corresponding MRB or DRB data transmission, the delivering the QoS flow data packet to the target RLC entity may be, if the first PDCP entity allows corresponding MRB data transmission, the delivering the QoS flow data packet to the first RLC entity, and if the second PDCP entity allows corresponding DRB data transmission, the delivering the QoS flow data packet to the second RLC entity. Whether the first PDCP entity allows the corresponding MRB data transmission or the second PDCP entity allows the corresponding DRB data transmission may be set according to actual requirements. For example: if the MRB is reliable enough, the DRB will not transmit, or if the MRB is unreliable, the DRB will be allowed to transmit, or both, etc.

For example: after a QoS flow data packet reaches an SDAP layer, the SDAP layer directly delivers the same data packet to PDCP layers corresponding to MRB and DRB at the same time, the PDCP layer starts a PDCP discard timer for each data packet, if the data packet does not need to be transmitted on the MRB or the DRB, the corresponding PDCP entity does not deliver the data packet to the RLC layer, and discards the data packet after the PDCP discard timer expires; if the data packet arrives at the PDCP layer, the MRB and DRB corresponding to the PDCP layer currently allow transmission, and the data packet can be directly delivered to the RLC layer.

In this embodiment, the space of the PDCP layer is saved by transmitting the allowed packets in time and discarding the packets that are allowed to be transmitted.

Optionally, if the target PDCP entity allows the corresponding MRB or DRB data transmission, then delivering the QoS flow data packet to the target RLC entity includes:

if the target PDCP entity allows the data transmission of the corresponding MRB or DRB, delivering the data packet in the QoS flow when the PDCP discard timer does not expire to the target RLC entity.

For example: if the corresponding MRB or DRB of the PDCP entity starts to allow transmission before the PDCP discard timer expires, the PDCP entity delivers the data packet which has not expired by the PDCP discard timer to the RLC entity.

If the target PDCP entity allows data transmission of the corresponding MRB or DRB, but there is a packet when PDCP discard timer expires, the packet may be discarded.

In another implementation manner, the transmitting the QoS flow through at least one of the MRB or the DRB includes:

the SDAP layer delivers the data packet of the QoS flow to the first PDCP entity which allows the MRB to perform data transmission, or delivers the data packet of the QoS flow to the second PDCP entity which allows the DRB to perform data transmission;

the PDCP entity receiving the data packet of the QoS flow delivers the data packet to a corresponding RLC entity.

In this implementation, the SDAP layer may be a PDCP entity that determines whether to allow MRB or DRB transmission, thereby delivering a data packet to the corresponding PDCP entity.

For example: and when the SDAP layer receives the trigger indication and allows the MRB or the DRB to transmit the QoS flow data packet, the SDAP layer delivers the QoS flow data packet to a PDCP entity corresponding to the MRB or the DRB, and the PDCP entity delivers the data packet to a lower layer and transmits the data packet. The trigger indication may be an indication that the network-side device decides and triggers according to a decision of the network-side device, or an indication that the terminal reports to the network-side device, for example, a request for transmitting a certain MBS service on the DRB is reported.

As an optional implementation manner, in the QoS flow of the MBS, the QoS flow mapped to the MRB is the same as the QoS flow mapped to the DRB; or The QoS flow mapped to MRB in the QoS flow of MBS is different from the QoS flow mapped to DRB wholly or partially.

The QoS flow mapped to MRB and the QoS flow mapped to DRB in the QoS flow of MBS may be the same, where the QoS flow mapped to MRB and the QoS flow mapped to DRB of a single terminal are completely the same, for example, QoS flow of QFI=1 and QoS flow of QFI=2 are mapped to MRB, and at the same time, these two QoS flows are mapped to DRB1 of terminal 1.

The QoS flow mapped to MRB and the QoS flow mapped to DRB in the QoS flow of MBS may be totally or partially different, but not totally the same QoS flow exists for the QoS flow mapped to MRB and DRB, for example: the QoS flow mapped to MRB and to single terminal DRB may be partly different, e.g. QoS flow of QFI=1 is mapped to MRB, QoS flow of QFI=1 and QoS flow of QFI=2 is mapped to DRB1 of terminal 1. Alternatively, there may not be the same QoS flow mapped to MRB and DRB, for example: QoS flow as QFI=1 is mapped to MRB, and QoS flow as QFI=2 is mapped to DRB1 of terminal 1.

Optionally, when there is a QoS flow associated with the mapping to the MRB and the DRB, the duplication detection and the repeated discard of the data packet of the QoS flow may be performed by the network-side device, or may be performed on the terminal without limitation.

As an optional embodiment, an interface is established between the first PDCP entity and the second PDCP entity, where the interface is configured to transfer information such that the first PDCP entity and the second PDCP entity add the same PDCP SN to the same data packet.

The interface establishment between the first PDCP entity and the second PDCP entity may be performed after step 201 is performed, or may be performed before step 201 is performed, or may be performed during step 201 is performed, which is not limited herein.

The interface is configured to transmit information so that the first PDCP entity and the second PDCP entity add the same PDCP SN to the same data packet, where the first PDCP entity and the second PDCP entity perform information transmission through the interface, so that if the first PDCP entity and the second PDCP entity receive the same data packet, the same data packet is set as the same PDCP SN to implement duplicate detection of the data packet.

In this embodiment, since the interface is established, the first PDCP entity and the second PDCP entity may add the same PDCP SN to the same data packet to implement duplicate packet detection.

Optionally, the method further includes:

and the PDCP entity which is sending the data packet of the QoS flow of the MBS in the first PDCP entity and the second PDCP entity determines the PDCP SN of the next data packet delivered from the SDAP layer and transmits the PDCP SN to the other PDCP entity, and the other PDCP entity distributes the PDCP SN to the next data packet delivered by the SDAP layer.

The PDCP entity that is sending the data packet of the QoS flow of the MBS may be the PDCP entity that is currently sending the data packet of the QoS flow of the MBS, but the next data packet may be sent by the PDCP entity and another PDCP entity, or by another PDCP entity, so that the PDCP SN of the next data packet may be determined to be transferred to another PDCP entity through the interface.

The next data packet delivered from the SDAP layer may be a data packet simultaneously delivered by the SDAP layer to the first PDCP entity and the second PDCP entity, or a data packet delivered by the SDAP layer to the first PDCP entity or the second PDCP entity.

In this embodiment, the PDCP SN of the next packet is transferred through the interface, so that the two PDCP entities can maintain the same PDCP SN to achieve the continuity of the PDCP SNs.

For example: when receiving the trigger indication, the SDAP layer delivers the QoS flow data packet to the PDCP entity corresponding to the MRB or DRB allowed to transmit, the PDCP layers of the MRB and DRB at the transmitting end can establish connection, the PDCP entity transmitting expects that two PDCP simultaneously receive the PDCP SN of the data packet from the SDAP layer to transmit to the PDCP entity corresponding to the MRB or DRB about to start transmitting the QoS flow data, and the two subsequent PDCP entities can maintain the same PDCP SN.

In the embodiment of the disclosure, QoS flow of MBS is mapped to MRB and Data Radio Bearer (DRB); transmitting the QoS flow through at least one of the MRB or the DRB. Because the QoS flow of the MBS is mapped to the MRB and the Data Radio Bearer (DRB), the reliability of the MBS can be improved.

Referring to FIG. 4, FIG. 4 is a flowchart of another data flow transmission method provided in an embodiment of the present disclosure, where the method is applied to a terminal, and as shown in FIG. 4, the method includes the following steps:

401. receiving QoS flow of MBS through at least one of MRB and DRB; and the QoS flow of the MBS has a mapping relation with the MRB and the DRB respectively.

The mapping relationship between the QoS flow of the MBS and the MRB and the DRB may be determined according to configuration information sent by a network-side device, for example: and receiving the QoS flow and MRB mapping configured by the network-side device, the DRB mapping relation and the related parameter configuration. Of course, the mapping relationship may also be reported to the network-side device by the terminal, which is not limited to this.

Optionally, the first Packet Data Convergence Protocol (PDCP) entity and the first Radio Link Control (RLC) entity corresponding to the MRB are independent from the second PDCP entity and the second RLC entity corresponding to the DRB.

Optionally, the first PDCP entity and the second PDCP entity independently have at least one of the following functions:
  decryption, de-integrity protection, or de-header compression functions.

Optionally, the MRB and the DRB share the same MAC entity; or

The MRB and the DRB correspond to different MAC entities.

Optionally, the receiving the QoS flow of the MBS through at least one of the MRB or the DRB includes:
  the first RLC entity transmits the data packet of the QoS flow of the MBS received by the MAC layer to the first PDCP entity, and the first PDCP entity uploads the data packet to the SDAP layer; and/or
  the second RLC entity transmits the data packet of the QoS flow of the MBS received by the MAC layer to the second PDCP entity, and the second PDCP entity uploads the data packet to the SDAP layer.

Optionally, the QoS flow mapped to the MRB in the QoS flow of the MBS is the same as the QoS flow mapped to the DRB; or The QoS flow mapped to MRB in the QoS flow of MBS is different from the QoS flow mapped to DRB wholly or partially.

Optionally, the method further includes:
  the first PDCP entity and/or the second PDCP entity deliver data packets to an upper layer, and duplication detection is carried out by the upper layer; or
  An interface is established between the first PDCP entity and the second PDCP entity, the first PDCP entity transmits a PDCP Protocol Data Unit (PDU) to the second PDCP entity through the interface, the second PDCP entity carries out duplication detection, and the PDCP PDU is a PDU containing a data packet of the QoS flow of the MBS; or
  And an interface is established between the first PDCP entity and the second PDCP entity, the second PDCP entity transmits PDCP PDUs to the first PDCP entity through the interface, the first PDCP entity carries out duplication detection, and the PDCP PDUs are PDUs of data packets containing the QoS flow of the MBS.

The higher layer may be an IP layer or other higher layers, and after receiving the data packet delivered by the first PDCP entity and/or the second PDCP entity, the higher layer may perform duplicate detection according to the content of the data packet, and may also perform duplicate discarding. For example: the terminal receives the downlink data sent by MRB and DRB independently, the PDCP layer directly submits to the higher layer after processing, and the higher layer (such as IP layer) realizes duplication detection and discarding.

An interface is established between the first PDCP entity and the second PDCP entity, the first PDCP entity transfers PDCP protocol data units PDUs to the second PDCP entity through the interface, and the second PDCP entity performs duplicate detection, where the PDCP PDUs are PDUs of data packets including the QoS flow of the MBS, and may be the second PDCP entity serving as a primary PDCP entity, the first PDCP entity serving as an auxiliary PDCP entity, and the auxiliary PDCP entity transfers PDCP PDUs to the primary PDCP entity, and the primary PDCP entity performs duplicate detection.

An interface is established between the first PDCP entity and the second PDCP entity, the second PDCP entity transfers PDCP PDUs to the first PDCP entity through the interface, and the first PDCP entity performs duplicate detection, where the PDCP PDUs are PDUs of a data packet containing the QoS flow of the MBS, and the first PDCP entity may be used as a main PDCP entity, the second PDCP entity as an auxiliary PDCP entity, and the auxiliary PDCP entity transfers PDCP PDUs to the main PDCP entity, and the main PDCP entity performs duplicate detection.

For example: the terminal establishes connection between MRB and receiving PDCP layer of DRB, one PDCP entity is used as a main entity, namely, the MRB or PDCP of the DRB is used as the main PDCP entity, the other PDCP entity is used as an auxiliary PDCP entity, the auxiliary PDCP entity transmits the PDCP PDUs which are subjected to decryption, integrity protection and header decompression (the three processes are optional according to the configuration of network-side device) to the main PDCP entity, and the main PDCP entity carries out duplication detection and discarding operation.

Optionally, the transferring the PDCP PDU to the second PDCP entity by the first PDCP entity through an interface includes: the first PDCP entity directly transmits the received PDCP PDUs to the second PDCP entity through an interface without sorting;
  the second PDCP entity transferring PDCP PDUs to the first PDCP entity through an interface, including: the second PDCP entity directly transfers the received PDCP PDUs to the first PDCP entity through an interface without sorting.

Since the data can be directly transmitted through the interface without sorting, the efficiency can be improved. Further, in this embodiment, the first PDCP entity and the second PDCP entity of the network-side device may maintain the same PDCP SN for the same data, that is, add the same PDCP SN in the PDCP layers corresponding to the MRB and the DRB for the same QoS flow data packet.

Optionally, the performing, by the first PDCP entity, duplicate detection includes:
  the first PDCP entity processes the received PDCP PDUs transferred by the second PDCP entity through the interface and the PDCP PDUs from the first RLC entity to carry out duplication detection, and if the PDCP SNs contained in the PDCP PDUs are already received in the first PDCP entity, the PDCP PDUs are discarded.

The first PDCP entity may detect duplication of the received PDCP PDUs transferred by the second PDCP entity through the interface with the PDCP PDUs from the first RLC entity by detecting whether there are duplicate PDCP PDUs in the PDCP PDUs received by the second PDCP entity and the PDCP PDUs received by the first RLC entity, and discard the PDCP PDUs if the PDCP SNs included in the PDCP PDUs have been received in the first PDCP entity.

Similarly, the performing of duplicate detection by the second PDCP entity may include:

the second PDCP entity processes the received PDCP PDUs transferred by the first PDCP entity through the interface and the PDCP PDUs from the second RLC entity together for duplication detection, and if the PDCP SNs contained in the PDCP PDUs are already received in the first PDCP entity, the PDCP PDUs are discarded.

It should be noted that, this embodiment is used as an implementation of the terminal corresponding to the embodiment shown in FIG. 2, and specific implementations thereof may refer to relevant descriptions of the embodiment shown in FIG. 2, so that, in order to avoid repeated descriptions, this embodiment is not described again, and the same beneficial effects may also be achieved.

The following exemplifies data flow transmission provided by the embodiment of the present disclosure, with a network-side device as a base station:

Example 1 in this embodiment, the QoS flow of the MBS service is transmitted through the MRB and the DRB at the same time, which may specifically be as follows:

a base station side:

step 1: the base station configures mapping between QoS flow (QFI=x) of MBS service and MRB1, and mapping between QoS flow and DRB1 of UE1, and configures layer 2 and layer 1 parameters of DRB1 of MRB1 and UE1 respectively. The MRB1 performs multicast transmission (using a multicast channel) on a group of terminals receiving the MBS service, and the DRB1 performs unicast transmission (using a unicast channel) on the UE 1.

Step 2: the SDAP layer of the base station maps QoS flow (QFI=x) of MBS service to the PDCP layers of MRB1 and DRB1 of UE1, can deliver data packets of QoS flow to the PDCP layers of MRB1 and DRB1 at the same time, and can deliver the data packets of QoS flow to the lower layer by the PDCP layers of MRB1 and/or DRB1, or can deliver the data packets of QoS flow to the PDCP layers of MRB1 or DRB1, and the data packets of MRB1 or DRB1 are delivered to the lower layer by the PDCP layers of MRB1 or DRB1, and are sent to the terminal at the air interface.

Terminal side (UE 1):

Step 1: receiving base station side configured QoS flow (QFI=x) and MRB1 mapping, and DRB1 mapping relation and related parameter configuration of UE 1.

Step 2: data packets of QoS flow (QFI=x) are received from the protocol stacks corresponding to MRB1 and DRB1, respectively.

Step 3: the receiving PDCP entity performs duplicate detection and duplicate deletion on the data received from the MRB1 and the DRB1, where the manner of duplicate detection and duplicate deletion may refer to the related manner of the embodiment shown in FIG. 4, and is not described herein again.

Example 2 in this embodiment, the QoS flow of the MBS service is changed from transmission through MRB to transmission through DRB, which may specifically be as follows:

a base station side:

step 1: the base station configures mapping between QoS flow (QFI=x) of MBS service and MRB1, and mapping between QoS flow and DRB1 of UE1, and configures layer 2 and layer 1 parameters of DRB1 of MRB1 and UE1 respectively. The MRB1 performs multicast transmission (using a multicast channel) on a group of terminals receiving the MBS service, and the DRB1 performs unicast transmission (using a unicast channel) on the UE 1. The two sets of configurations can be performed simultaneously or separately, for example, mapping of QoS flow (QFI=x) to DRB1 is configured only before the transmission mode needs to be changed.

Step 2: the SDAP layer of the base station maps QoS flow (QFI=x) of MBS service to MRB1 for transmission, and delivers data packets to a PDCP entity of MRB1 for transmission. If the QoS flow of the MBS service is determined not to need to be transmitted by the multicast mode, the QoS flow is changed to be transmitted only by the DRB1 of the UE1 (if other UEs can also receive the MBS by the unicast, the operation process is the same as that of the UE 1). The base station transmits the data packet of the MBS service QoS flow through the channel of the DRB 1. The specific procedure of delivering the data packet from the SDAP layer to the PDCP layer can be implemented as the embodiment shown in FIG. 2. For example: if the mode of delivering the data packets to the PDCP entities of the MRB1 and the DRB1 is adopted, before the MRB1 or the DRB1 is released, the SDAP delivers the arriving MBS service data packets to the two PDCP entities simultaneously; if the mode of delivering the data packets to the PDCP entity of the MRB1 or the DRB1 is adopted, the SDAP layer delivers the QoS flow data packets of the MBS service to the PDCP layer entity of the MRB1 before the transmission mode is changed, and delivers the QoS flow data packets of the MBS service to the PDCP layer entity of the DRB1 after the change.

Terminal Side (UE 1):

Step 1: receiving base station side configured QoS flow (QFI=x) and MRB1 mapping, and DRB1 mapping relation and related parameter configuration of UE 1.

Step 2: and receiving data of the MBS service from a protocol stack corresponding to the MRB1 and a lower layer configuration. When the QoS flow of the MBS service is changed from multi-cast transmission to unicast transmission, a protocol stack corresponding to the DRB1 and a lower layer configuration are used for receiving a data packet of the QoS flow.

Step 3: during a change from multicast to unicast transmission, portions of the data packets may be transmitted from both MRB1 and DRB 1. The receiving PDCP entity performs duplicate detection and duplicate deletion on the data received from the MRB1 and the DRB1, where the manner of duplicate detection and duplicate deletion may refer to the related manner of the embodiment shown in FIG. 4, and details are not repeated here.

Example 3 in this embodiment, the QoS flow of the MBS service is changed from transmission through the DRB to transmission through the MRB, which may specifically be as follows:

a base station side:

step 1: the base station configures mapping between QoS flow (QFI=x) of MBS service and MRB1, and mapping between QoS flow and DRB1 of UE1, and configures layer 2 and layer 1 parameters of DRB1 of MRB1 and UE1 respectively. The MRB1 performs multicast transmission (using a multicast channel) on a group of terminals receiving the MBS service, and the DRB1 performs unicast transmission (using a unicast channel) on the UE 1. The two sets of configurations can be performed simultaneously or separately, for example, mapping of QoS flow (QFI=x) to MRB1 is configured only before the transmission mode needs to be changed.

Step 2: the SDAP layer of the base station maps QoS flow (QFI=x) of MBS service to DRB1 for transmission, and delivers data packets to a PDCP entity of DRB1 for transmission. If the QoS flow of the MBS service is determined not to be transmitted in a unicast mode, but is only transmitted through the MRB1, the base station transmits the data packet of the MBS service QoS flow through the channel of the MRB 1. The specific procedure of delivering the data packet from the SDAP layer to the PDCP layer can be implemented as the embodiment shown in FIG. 2. For example: if the mode of delivering the data packets to the PDCP entities of the MRB1 and the DRB1 is adopted, before the MRB1 or the DRB1 is released, the SDAP delivers the arriving MBS service data packets to the two PDCP entities simultaneously; if the mode of delivering the data packets to the PDCP entity of the MRB1 or the DRB1 is adopted, the SDAP layer delivers the QoS flow data packets of the MBS service to the PDCP layer entity of the DRB1 before the transmission mode is changed, and delivers the QoS flow data packets of the MBS service to the PDCP layer entity of the MRB1 after the change.

Terminal Side (UE 1):

Step 1: receiving base station side configured QoS flow (QFI=x) and MRB1 mapping, and DRB1 mapping relation and related parameter configuration of UE 1.

Step 2: and receiving data of the MBS service from a protocol stack corresponding to the DRB1 and low-layer configuration. When the QoS flow of the MBS service is changed from unicast transmission to multicast transmission, a protocol stack corresponding to the MRB1 and low-layer configuration are used for receiving a data packet of the QoS flow.

Step 3: during a change from unicast transmission to multicast transmission, portions of the data packets may be transmitted from MRB1 and DRB1 simultaneously. The receiving PDCP entity performs duplicate detection and duplicate deletion on the data received from the MRB1 and the DRB1, where the manner of duplicate detection and duplicate deletion may refer to the related manner of the embodiment shown in FIG. 4, and details are not repeated here.

Figure 5:
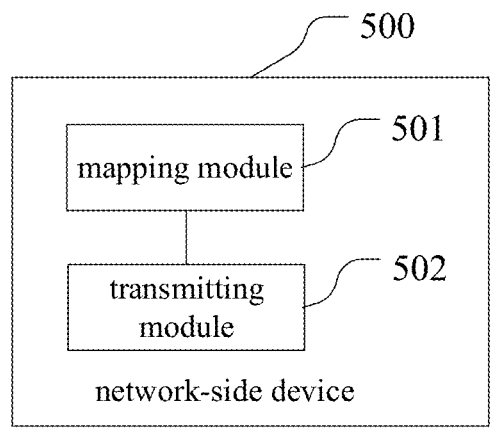
FIG. 5 is a structural diagram of a network-side device in an embodiment of the present disclosure.

Referring to FIG. 5, FIG. 5 is a structural diagram of a network-side device according to an embodiment of the present disclosure, and as shown in FIG. 5, the network-side device 500 includes:

a mapping module 501, configured to map a QoS flow of a Multicast and Broadcast Services (MBS) to a MBS Radio Bearer (MRB) and a Data Radio Bearer (DRB);

a transmitting module 502, configured to transmit the QoS flow through at least one of the MRB or the DRB.

Optionally, mapping the QoS flow of the MBS to the MRB and the DRB includes:

and mapping the QoS flow of the MBS to an MRB and a DRB through an SDAP layer, where a first PDCP entity and a first RLC entity corresponding to the MRB are independent from a second PDCP entity and a second RLC entity corresponding to the DRB.

Optionally, the first PDCP entity and the second PDCP entity independently have at least one of the following functions:

performs encryption, integrity protection, or header compression functions.

Optionally, the MRB and the DRB share the same MAC entity; or

The MRB and the DRB correspond to different MAC entities.

Optionally, the transmitting module 502 is configured to:
the SDAP layer delivers the data packets of the QoS flow to the first PDCP entity and the second PDCP entity;
the first PDCP entity delivers the data packet to the first RLC entity, and/or the second PDCP entity delivers the data packet to the second RLC entity.

Optionally, the first PDCP entity delivering the data packet to the first RLC entity, and/or the second PDCP entity delivering the data packet to the second RLC entity includes:
the target PDCP entity starts a corresponding PDCP discard timer aiming at each data packet of the QoS flow;
if the target PDCP entity allows the data transmission of the corresponding MRB or DRB, the data packet of the QoS flow is delivered to a target RLC entity;
if the target PDCP does not allow the data transmission of the corresponding MRB or DRB, discarding the data packet of which the PDCP discard timer expires;
the target PDCP is the first PDCP entity, the target RLC is the first RLC entity, or the target PDCP is the second PDCP entity, and the target RLC is the second RLC entity.

Optionally, if the target PDCP entity allows the corresponding MRB or DRB data transmission, then delivering the QoS flow data packet to the target RLC entity includes:
if the target PDCP entity allows the data transmission of the corresponding MRB or DRB, delivering the data packet in the QoS flow when the PDCP discard timer does not expire to the target RLC entity.

Optionally, the transmitting module 502 is configured to:
the SDAP layer delivers the data packet of the QoS flow to the first PDCP entity which allows the MRB to perform data transmission, or delivers the data packet of the QoS flow to the second PDCP entity which allows the DRB to perform data transmission;
the PDCP entity receiving the data packet of the QoS flow delivers the data packet to a corresponding RLC entity.

Optionally, the QoS flow mapped to the MRB in the QoS flow of the MBS is the same as the QoS flow mapped to the DRB; or
The QoS flow mapped to MRB in the QoS flow of MBS is different from the QoS flow mapped to DRB wholly or partially.

Optionally, an interface is established between the first PDCP entity and the second PDCP entity, where the interface is configured to transfer information so that the first PDCP entity and the second PDCP entity add the same PDCP SN to the same data packet.

Figure 6:
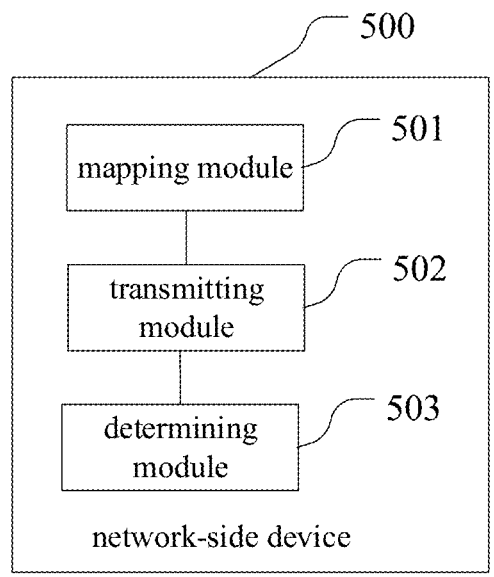
FIG. 6 is another block diagram of a network-side device in an embodiment of the present disclosure.

Optionally, as shown in FIG. 6, the network-side device further includes:
a determining module 503, configured to determine a PDCP SN of a next data packet delivered from the SDAP layer by a PDCP entity that is sending a data packet of the QoS flow of the MBS in the first PDCP entity and the second PDCP entity, and transmit the PDCP SN to another PDCP entity, where the another PDCP entity allocates the PDCP SN to the next data packet delivered by the SDAP layer.

It should be noted that, in this embodiment, the network-side device 500 may be a network-side device in any implementation manner in the method embodiment in the present disclosure, and any implementation manner of the network-side device in the method embodiment in the present disclosure may be implemented by the network-side device 500 in this embodiment to achieve the same beneficial effect, which is not described herein again.

Figure 7:
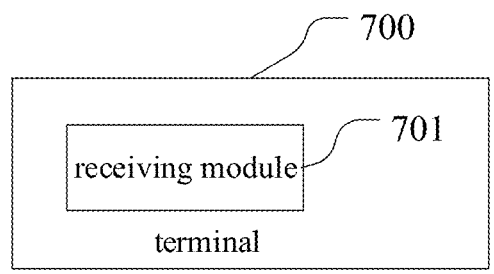
FIG. 7 is a block diagram of a terminal in an embodiment of the present disclosure.

Referring to FIG. 7, FIG. 7 is a structural diagram of a terminal according to an embodiment of the present disclosure, and as shown in FIG. 7, a terminal 700 includes:
  a receiving module 701, configured to receive a QoS flow of a Multicast and Broadcast Services (MBS) through at least one of a MBS Radio Bearer (MRB) and a Data Radio Bearer (DRB); and the QoS flow of the MBS has a mapping relation with the MRB and the DRB respectively.

Optionally, the first Packet Data Convergence Protocol (PDCP) entity and the first Radio Link Control (RLC) entity corresponding to the MRB are independent from the second PDCP entity and the second RLC entity corresponding to the DRB.

Optionally, the first PDCP entity and the second PDCP entity independently have at least one of the following functions:
  perform decryption, de-integrity protection, or de-header compression functions.

Optionally, the MRB and the DRB share the same MAC entity; or
The MRB and the DRB correspond to different MAC entities.
  Optionally, the receiving module 701 is configured to:
  the first RLC entity transmits the data packet of the QoS flow of the MBS received by the MAC layer to the first PDCP entity, and the first PDCP entity uploads the data packet to a Service Data Adaptation Protocol (SDAP) layer; and/or
  And the second RLC entity transmits the data packet of the QoS flow of the MBS received by the MAC layer to the second PDCP entity, and the second PDCP entity uploads the data packet to the SDAP layer.
  Optionally, the QoS flow mapped to the MRB in the QoS flow of the MBS is the same as the QoS flow mapped to the DRB; or
The QoS flow mapped to MRB in the QoS flow of MBS is different from the QoS flow mapped to DRB wholly or partially.

Figure 8:
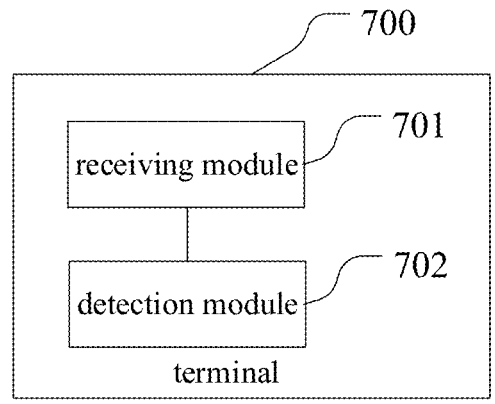
FIG. 8 is another block diagram of a terminal in an embodiment of the present disclosure.

Optionally, as shown in FIG. 8, the terminal 700 further includes a detection module 702, configured to:
  the first PDCP entity and/or the second PDCP entity deliver data packets to an upper layer, and duplication detection is carried out by the upper layer; or
  An interface is established between the first PDCP entity and the second PDCP entity, the first PDCP entity transmits PDCP PDUs to the second PDCP entity through the interface, the second PDCP entity carries out duplication detection, and the PDCP PDUs are PDUs of data packets containing QoS flow of the MBS; or
  And an interface is established between the first PDCP entity and the second PDCP entity, the second PDCP entity transmits PDCP PDUs to the first PDCP entity through the interface, the first PDCP entity carries out duplication detection, and the PDCP PDUs are PDUs of data packets containing the QoS flow of the MBS.
  Optionally, the transferring the PDCP PDU to the second PDCP entity by the first PDCP entity through an interface includes: the first PDCP entity directly transmits the received PDCP PDUs to the second PDCP entity through an interface without sorting;
  the second PDCP entity transferring PDCP PDUs to the first PDCP entity through an interface, including: the second PDCP entity directly transfers the received PDCP PDUs to the first PDCP entity through an interface without sorting.

Optionally, the performing, by the first PDCP entity, duplicate detection includes:
  the first PDCP entity processes the received PDCP PDUs transferred by the second PDCP entity through the interface and the PDCP PDUs from the first RLC entity together for duplication detection, and if the PDCP SNs contained in the PDCP PDUs are already received in the first PDCP entity, the PDCP PDUs are discarded;
  the second PDCP entity performing duplicate detection, including:
  the second PDCP entity processes the received PDCP PDUs transferred by the first PDCP entity through the interface and the PDCP PDUs from the second RLC entity together for duplication detection, and if the PDCP SNs contained in the PDCP PDUs are already received in the first PDCP entity, the PDCP PDUs are discarded.

It should be noted that, in this embodiment, the terminal 700 may be a terminal in any implementation manner in the method embodiment in the present disclosure, and any implementation manner of the terminal in the method embodiment in the present disclosure may be implemented by the terminal 700 in this embodiment to achieve the same beneficial effect, which is not described herein again.

Figure 9:
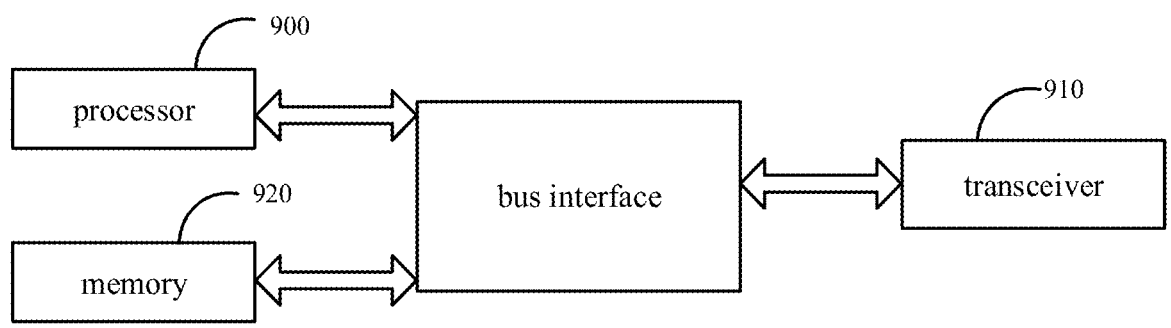
FIG. 9 is another block diagram of a network-side device in an embodiment of the present disclosure.

Referring to FIG. 9, FIG. 9 is a structural diagram of another network-side device provided in an embodiment of the present disclosure, and as shown in FIG. 9, the network-side device includes: a transceiver 910, a memory 920, a processor 900, and a program stored on the memory 920 and executable on the processor, where:
  the transceiver 910 or the processor 900 is configured to map a QoS flow of a Multicast and Broadcast Services (MBS) to a MBS Radio Bearer (MRB) and a Data Radio Bearer (DRB);
  the transceiver 910 is configured to transmit the QoS flow through at least one of the MRB or the DRB.

Among other things, the transceiver 910 may be used to receive and transmit data under the control of the processor 900.

In FIG. 9, the bus architecture may include any number of interconnected buses and bridges, with various circuits representing one or more processors, in particular processor 900, and a memory, in particular memory 920. The bus architecture may also link together various other circuits such as peripherals, voltage regulators, power management circuits, and the like, which are well known in the art, and therefore, will not be described any further herein. The bus interface provides an interface. The transceiver 910 may be a plurality of elements including a transmitter and a receiver that provide a means for communicating with various other apparatus over a transmission medium.

The processor 900 is responsible for managing the bus architecture and general processing, and the memory 920 may store data used by the processor 900 in performing operations.

It should be noted that the memory 920 is not limited to be only on the network-side device, and the memory 920 and the processor 900 may be separated and located in different geographical locations.

Optionally, mapping the QoS flow of the MBS to the MRB and the DRB includes:

and mapping the QoS flow of the MBS to an MRB and a DRB through an SDAP layer, where a first PDCP entity and a first RLC entity corresponding to the MRB are independent from a second PDCP entity and a second RLC entity corresponding to the DRB.

Optionally, the first PDCP entity and the second PDCP entity independently have at least one of the following functions:

performs encryption, integrity protection, or header compression functions.

Optionally, the MRB and the DRB share the same MAC entity; or

The MRB and the DRB correspond to different MAC entities.

Optionally, the transmitting the QoS flow through at least one of the MRB or the DRB includes:

the SDAP layer delivers the data packets of the QoS flow to the first PDCP entity and the second PDCP entity;

the first PDCP entity delivers the data packet to the first RLC entity, and/or the second PDCP entity delivers the data packet to the second RLC entity.

Optionally, the first PDCP entity delivering the data packet to the first RLC entity, and/or the second PDCP entity delivering the data packet to the second RLC entity includes:

the target PDCP entity starts a corresponding PDCP discard timer aiming at each data packet of the QoS flow;

if the target PDCP entity allows the data transmission of the corresponding MRB or DRB, the data packet of the QoS flow is delivered to a target RLC entity;

if the target PDCP does not allow the data transmission of the corresponding MRB or DRB, discarding the data packet of which the PDCP discard timer expires;

where, the target PDCP is the first PDCP entity, the target RLC is the first RLC entity, or the target PDCP is the second PDCP entity, and the target RLC is the second RLC entity.

Optionally, if the target PDCP entity allows the corresponding MRB or DRB data transmission, then delivering the QoS flow data packet to the target RLC entity includes:

if the target PDCP entity allows the data transmission of the corresponding MRB or DRB, delivering the data packet in the QoS flow when the PDCP discard timer does not expire to the target RLC entity.

Optionally, the transmitting the QoS flow through at least one of the MRB or the DRB includes:

the SDAP layer delivers the data packet of the QoS flow to the first PDCP entity which allows the MRB to perform data transmission, or delivers the data packet of the QoS flow to the second PDCP entity which allows the DRB to perform data transmission;

the PDCP entity receiving the data packet of the QoS flow delivers the data packet to a corresponding RLC entity.

Optionally, the QoS flow mapped to the MRB in the QoS flow of the MBS is the same as the QoS flow mapped to the DRB; or The QoS flow mapped to MRB in the QoS flow of MBS is different from the QoS flow mapped to DRB wholly or partially.

Optionally, an interface is established between the first PDCP entity and the second PDCP entity, where the interface is configured to transfer information, so that the first PDCP entity and the second PDCP entity add the same PDCP Sequence Number (SN) to the same data packet.

Optionally, the transceiver 910 or the processor 900 is further configured to:

and the PDCP entity which is sending the data packet of the QoS flow of the MBS in the first PDCP entity and the second PDCP entity determines the PDCP SN of the next data packet delivered from the SDAP layer and transmits the PDCP SN to the other PDCP entity, and the other PDCP entity distributes the PDCP SN to the next data packet delivered by the SDAP layer.

It should be noted that, in this embodiment, the network-side device may be a network-side device in any implementation manner in the method embodiment in the present disclosure, and any implementation manner of the network-side device in the method embodiment in the present disclosure may be implemented by the network-side device in this embodiment to achieve the same beneficial effect, which is not described herein again.

Figure 10:
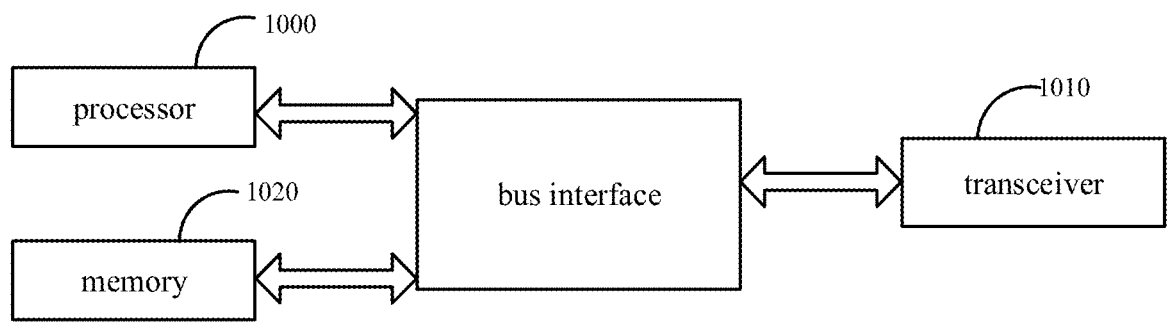
FIG. 10 is another block diagram of a terminal in an embodiment of the present disclosure.

Referring to FIG. 10, FIG. 10 is a structural diagram of another terminal provided in the embodiment of the present disclosure, and as shown in FIG. 10, the terminal includes: a transceiver 1010, a memory 1020, a processor 1000, and a program stored on the memory 1020 and executable on the processor 1000, where:

the transceiver 1010 is configured to receive a QoS flow of a Multicast and Broadcast Services (MBS) through at least one of a MBS Radio Bearer (MRB) and a Data Radio Bearer (DRB); and the QoS flow of the MBS has a mapping relation with the MRB and the DRB respectively.

Among other things, the transceiver 1010 may be used to receive and transmit data under the control of the processor 1000.

In FIG. 10, the bus architecture may include any number of interconnected buses and bridges, with various circuits being linked together, in particular, one or more processors, represented by processor 1000, and a memory, represented by memory 1020. The bus architecture may also link together various other circuits such as peripherals, voltage regulators, power management circuits, and the like, which are well known in the art, and therefore, will not be described any further herein. The bus interface provides an interface. The transceiver 1010 may be a number of elements including a transmitter and a receiver that provide a means for communicating with various other apparatus over a transmission medium.

The processor 1000 is responsible for managing the bus architecture and general processing, and the memory 1020 may store data used by the processor 1000 in performing operations.

It should be noted that the memory 1020 is not limited to being on the terminal, and the memory 1020 and the processor 1000 may be separated in different geographical locations.

Optionally, the first Packet Data Convergence Protocol (PDCP) entity and the first Radio Link Control (RLC) entity corresponding to the MRB are independent from the second PDCP entity and the second RLC entity corresponding to the DRB.

Optionally, the first PDCP entity and the second PDCP entity independently have at least one of the following functions:

perform decryption, de-integrity protection, or de-header compression functions.

Optionally, the MRB and the DRB share the same MAC entity; or

The MRB and the DRB correspond to different MAC entities.

Optionally, the receiving the QoS flow of the MBS through at least one of the MRB or the DRB includes:

the first RLC entity transmits the data packet of the QoS flow of the MBS received by the MAC layer to the first PDCP entity, and the first PDCP entity uploads the data packet to a Service Data Adaptation Protocol (SDAP) layer; and/or And the second RLC entity transmits the data packet of the QoS flow of the MBS received by the MAC layer to the second PDCP entity, and the second PDCP entity uploads the data packet to the SDAP layer.

Optionally, the QoS flow mapped to the MRB in the QoS flow of the MBS is the same as the QoS flow mapped to the DRB; or The QoS flow mapped to MRB in the QoS flow of MBS is different from the QoS flow mapped to DRB wholly or partially.

Optionally, the transceiver 1010 or the processor 1000 is further configured to:

the first PDCP entity and/or the second PDCP entity deliver data packets to an upper layer, and duplication detection is carried out by the upper layer; or An interface is established between the first PDCP entity and the second PDCP entity, the first PDCP entity transmits a PDCP Protocol Data Unit (PDU) to the second PDCP entity through the interface, the second PDCP entity carries out duplication detection, and the PDCP PDU is a PDU containing a data packet of the QoS flow of the MBS; or And an interface is established between the first PDCP entity and the second PDCP entity, the second PDCP entity transmits PDCP PDUs to the first PDCP entity through the interface, the first PDCP entity carries out duplication detection, and the PDCP PDUs are PDUs of data packets containing the QoS flow of the MBS.

Optionally, the transferring the PDCP PDU to the second PDCP entity by the first PDCP entity through an interface includes: the first PDCP entity directly transmits the received PDCP PDUs to the second PDCP entity through an interface without sorting;

the second PDCP entity transferring PDCP PDUs to the first PDCP entity through an interface, including: the second PDCP entity directly transfers the received PDCP PDUs to the first PDCP entity through an interface without sorting.

Optionally, the performing, by the first PDCP entity, duplicate detection includes:

the first PDCP entity processes the received PDCP PDUs transferred by the second PDCP entity through the interface and the PDCP PDUs from the first RLC entity together for duplication detection, and if the PDCP SNs contained in the PDCP PDUs are already received in the first PDCP entity, the PDCP PDUs are discarded;

the second PDCP entity performing duplicate detection, including:

the second PDCP entity processes the received PDCP PDUs transferred by the first PDCP entity through the interface and the PDCP PDUs from the second RLC entity together for duplication detection, and if the PDCP SNs contained in the PDCP PDUs are already received in the first PDCP entity, the PDCP PDUs are discarded.

It should be noted that, the terminal in this embodiment may be a terminal in any implementation manner in the method embodiment in the embodiment of the present disclosure, and any implementation manner of the terminal in the method embodiment in the embodiment of the present disclosure may be implemented by the terminal in this embodiment to achieve the same beneficial effect, and details are not described here again.

The disclosed embodiment also provides a computer readable storage medium, on which a computer program is stored, where the program is executed by a processor to implement the steps in the data flow transmission method on the network-side device side provided by the disclosed embodiment, or the program is executed by a processor to implement the steps in the data flow transmission method on the terminal side provided by the disclosed embodiment.

In the several embodiments provided in the present application, it should be understood that the disclosed method and apparatus may be implemented in other manners. For example, the above-described apparatus embodiments are merely illustrative, and for example, the division of the units is only one type of logical functional division, and other divisions may be realized in practice, for example, multiple units or components may be combined or integrated into another system, or some features may be omitted, or not executed. In addition, the shown or discussed mutual coupling or direct coupling or communication connection may be an indirect coupling or communication connection through some interfaces, devices or units, and may be in an electrical, mechanical or other form.

In addition, functional units in the embodiments of the present disclosure may be integrated into one processing unit, or each unit may be separately and physically included, or two or more units may be integrated into one unit. The integrated unit may be implemented in the form of hardware, or in the form of hardware plus a software functional unit.

The integrated unit implemented in the form of a software functional unit may be stored in a computer-readable storage medium. The software functional unit is stored in a storage medium and includes several instructions to enable a computer device (which may be a personal computer, a server, or a network-side device, etc.) to execute some steps of the method for processing the information data block according to various embodiments of the present disclosure. And the aforementioned storage medium includes: a U-disk, a portable hard disk, a Read-Only Memory (ROM), a Random Access Memory (RAM), a magnetic disk or an optical disk, and other media capable of storing program codes.

It should be noted that the division of each module is only a logical division, and all or part of the actual implementation may be integrated into one physical entity or may be physically separated. And these modules can all be implemented in the form of software invoked by a processing element; or can be implemented in the form of hardware; and part of the modules can be realized in the form of calling software by the processing element, and part of the modules can be realized in the form of hardware. For example, the determining module may be a processing element separately set up, or may be integrated into a chip of the apparatus, or may be stored in a memory of the apparatus in the form of program code, and a processing element of the apparatus calls and executes the function of the determining module. The other modules are implemented similarly. In addition, all or part of the modules can be integrated together or can be independently realized. The processing element described herein may be an integrated circuit having signal processing capabilities. In implementation, each step of the above method or each module above may be implemented by an integrated logic circuit of hardware in a processor element or an instruction in the form of software.

For example, the various modules, units, sub-units or sub-modules may be one or more integrated circuits configured to implement the above methods, such as: one or more Application Specific Integrated Circuits (ASICs), or one or more microprocessors (DSPs), or one or more Field Programmable Gate Arrays (FPGAs), among others. For another example, when some of the above modules are implemented in the form of a Processing element scheduler code, the Processing element may be a general-purpose processor, such as a Central Processing Unit (CPU) or other processor that can call the program code. As another example, these modules may be integrated together and implemented in the form of a system-on-a-chip (SOC).

The terms "first," "second," and the like in the description and in the claims of the present disclosure are used for distinguishing between similar elements and not necessarily for describing a particular sequential or chronological order. It is to be understood that the data so used may be interchanged under appropriate circumstances such that embodiments of the disclosure described herein may be implemented, for example, in sequences other than those illustrated or described herein. Moreover, the terms "includes," "including," and "having," and any variations thereof, are intended to cover a non-exclusive inclusion, such that a process, method, system, article, or apparatus that includes a list of steps or elements is not necessarily limited to those steps or elements expressly listed, but may include other steps or elements not expressly listed or inherent to such process, method, article, or apparatus. Further, the use of "and/or" in the specification and claims means that at least one of the connected objects, such as a and/or B and/or C, means that 7 cases are included that include a alone, B alone, C alone, and both a and B, B and C, a and C, and A, B and C. Similarly, the use of "at least one of A and B" in the specification and claims is to be understood as "A alone, B alone, or both A and B present".

While the foregoing is directed to alternative embodiments of the present disclosure, it will be appreciated by those skilled in the art that various changes and modifications may be made therein without departing from the principles of the disclosure, and it is intended that such changes and modifications be covered by the scope of the disclosure.

What is claimed is:

1. A data flow transmission method, performed by network-side device and comprising:
   determining a mapping relationship between Quality of Service (QOS) flows of Multicast and Broadcast Services (MBS) and a radio bearer with multicast and broadcast transmission and a mapping relationship between the QoS flows of the MBS and a radio bearer with unicast transmission;
   transmitting the QoS flows through at least one of the radio bearer with multicast and broadcast transmission or the radio bearer with unicast transmission based on the mapping relationship;
   wherein the QoS flows mapped to the radio bearer with multicast and broadcast transmission in the QoS flows of the MBS and the QoS flows mapped to the radio bearer with unicast transmission in the QoS flows of the MBS are partially or totally different.

2. The method of claim 1, wherein the mapping the QoS flows of the MBS to the radio bearer with multicast and broadcast transmission and the radio bearer with unicast transmission comprises:
   mapping the QoS flows of the MBS to the radio bearer with multicast and broadcast transmission and the radio bearer with unicast transmission through a Service Data Adaptation Protocol (SDAP) layer, wherein a first Packet Data Convergence Protocol (PDCP) entity and a first Radio Link Control (RLC) entity which correspond to the radio bearer with multicast and broadcast transmission are independent from a second PDCP entity and a second RLC entity which correspond to the radio bearer with unicast transmission.

3. The method of claim 2, wherein the first PDCP entity and the second PDCP entity comprise independently at least one of the following functions:
   encryption, integrity protection, or header compression functions.

4. The method of claim 2, wherein
   the radio bearer with multicast and broadcast transmission and the radio bearer with unicast transmission share a same Media Access Control (MAC) entity.

5. The method of claim 2, wherein the transmitting the QoS flows through at least one of the radio bearer with multicast and broadcast transmission or the radio bearer with unicast transmission comprises:
   the SDAP layer delivering data packets of the QoS flows to the first PDCP entity, the first PDCP entity delivering the data packets to the first RLC entity; and/or the SDAP layer delivering data packets of the QoS flows to the second PDCP entity, the second PDCP entity delivering the data packet to the second RLC entity.

6. The method of claim 5, wherein the first PDCP entity delivering the data packets to the first RLC entity, the second PDCP entity delivering the data packets to the second RLC entity comprises:
   a target PDCP entity starting a corresponding PDCP discard timer aiming at each data packet of the QoS flows;
   after determining that the target PDCP entity allows a data transmission of the corresponding radio bearer with multicast and broadcast transmission or radio bearer with unicast transmission, delivering the data packets of the QoS flows to a target RLC entity;
   after determining that the target PDCP does not allow the data transmission of the corresponding radio bearer with multicast and broadcast transmission or radio bearer with unicast transmission, discarding the data packets when the PDCP discard timer expires;
   wherein the target PDCP is the first PDCP entity and the target RLC is the first RLC entity, or the target PDCP is the second PDCP entity and the target RLC is the second RLC entity.

7. The method of claim 2, wherein the radio bearer with multicast and broadcast transmission and the radio bearer with unicast transmission correspond to different MAC entities.

8. A data flow transmission method, performed by a terminal and comprising:
   receiving, from a network-side device, a mapping relationship between Quality of Service (QoS) flows of Multicast and Broadcast Services (MBS) and a radio bearer with multicast and broadcast transmission and a mapping relationship between the QoS flows of the MBS and a radio bearer with unicast transmission;
   receiving, from the network-side device, the QoS flows of the MBS through at least one of the radio bearer with multicast and broadcast transmission or the radio bearer with unicast transmission based on the mapping relationship;
   wherein the QoS flows mapped to the radio bearer with multicast and broadcast transmission in the QoS flows of the MBS and the QoS flows mapped to the radio bearer with unicast transmission in the QoS flows of the MBS are partially or totally different.

9. The method of claim 8, wherein a first Packet Data Convergence Protocol (PDCP) entity and a first Radio Link Control (RLC) entity which correspond to the radio bearer with multicast and broadcast transmission are independent from a second PDCP entity and a second RLC entity which correspond to the radio bearer with unicast transmission.

10. The method of claim 9, wherein the first PDCP entity and the second PDCP entity comprise independently at least one of the following functions:
   decryption, de-integrity protection, or de-header compression functions.

11. The method of claim 9, wherein
   the radio bearer with multicast and broadcast transmission and the radio bearer with unicast transmission share a same Media Access Control (MAC) entity.

12. The method of claim 9, wherein the receiving the QoS flows of the MBS through at least one of the radio bearer with multicast and broadcast transmission or the radio bearer with unicast transmission comprises:
   the first RLC entity transmitting data packets of the QoS flows of the MBS received by the MAC layer to the first PDCP entity, and the first PDCP entity uploading the data packets to a Service Data Adaptation Protocol (SDAP) layer; and/or
   the second RLC entity transmitting data packets of the QoS flows of the MBS received by the MAC layer to the second PDCP entity, and the second PDCP entity uploading the data packets to an SDAP layer.

13. The method of claim 9, wherein the radio bearer with multicast and broadcast transmission and the radio bearer with unicast transmission correspond to different MAC entities.

14. A network-side device, comprising: a transceiver, a memory, a processor, and a program stored on the memory and executable on the processor,
   wherein the processor executes the program to perform the data flow transmission method according to claim 1.

15. The network-side device of claim 14, wherein the mapping the QoS flow of the MBS to the radio bearer with multicast and broadcast transmission and the radio bearer with unicast transmission comprises:
   mapping the QoS flows of the MBS to the radio bearer with multicast and broadcast transmission and the radio bearer with unicast transmission through a Service Data Adaptation Protocol (SDAP) layer, wherein a first Packet Data Convergence Protocol (PDCP) entity and a first Radio Link Control (RLC) entity which correspond to the radio bearer with multicast and broadcast transmission are independent from a second PDCP entity and a second RLC entity which correspond to the radio bearer with unicast transmission.

16. The network-side device of claim 15, wherein the transmitting the QoS flows through at least one of the radio bearer with multicast and broadcast transmission or the radio bearer with unicast transmission comprises:

the SDAP layer delivering data packets of the QoS flows to the first PDCP entity, the first PDCP entity delivering the data packets to the first RLC entity; and/or the SDAP layer delivering data packets of the QoS flows to the second PDCP entity, the second PDCP entity delivering the data packet to the second RLC entity.

17. A terminal, comprising: a transceiver, a memory, a processor, and a program stored on the memory and executable on the processor,
   the transceiver is configured to:
   receive, from a network-side device, a mapping relationship between Quality of Service (QoS) flows of Multicast and Broadcast Services (MBS) and a radio bearer with multicast and broadcast transmission and a mapping relationship between the QoS flows of the MBS and a radio bearer with unicast transmission;
   receive, from the network-side device, the QoS flows of the MBS through at least one of the radio bearer with multicast and broadcast transmission or the radio bearer with unicast transmission based on the mapping relationship between the QoS flows of the MBS and the radio bearer with multicast and broadcast transmission and the mapping relationship between the QoS flows of the MBS and the radio bearer with unicast transmission;
   wherein the QoS flows mapped to the radio bearer with multicast and broadcast transmission in the QoS flows of the MBS and the QoS flows mapped to the radio bearer with unicast transmission in the QoS flows of the MBS are partially or totally different.

18. The terminal of claim 17, wherein a first Packet Data Convergence Protocol (PDCP) entity and a first Radio Link Control (RLC) entity which correspond to the radio bearer with multicast and broadcast transmission are independent from a second PDCP entity and a second RLC entity which correspond to the radio bearer with unicast transmission.

19. The terminal of claim 18, wherein the receiving the QoS flows of the MBS through at least one of the radio bearer with multicast and broadcast transmission and or the radio bearer with unicast transmission comprises:
   the first RLC entity transmitting data packets of the QoS flows of the MBS received by the MAC layer to the first PDCP entity, and the first PDCP entity uploading the data packets to a Service Data Adaptation Protocol (SDAP) layer; and/or
   the second RLC entity transmitting data packets of the QoS flows of the MBS received by the MAC layer to the second PDCP entity, and the second PDCP entity uploading the data packets to an SDAP layer.

20. The terminal of claim 18, wherein the radio bearer with multicast and broadcast transmission and the radio bearer with unicast transmission share a same Media Access Control (MAC) entity; or
   the radio bearer with multicast and broadcast transmission and the radio bearer with unicast transmission correspond to different MAC entities.

\* \* \* \* \*